(12) United States Patent
Yoakum et al.

(10) Patent No.: US 10,477,019 B2
(45) Date of Patent: Nov. 12, 2019

(54) CONTACT CENTER ADMINISTRATION VIA TEXT STREAM INTERACTION

(71) Applicant: Avaya Inc., Santa Clara, CA (US)

(72) Inventors: John H. Yoakum, Cary, NC (US); Tony McCormack, Barna (IE)

(73) Assignee: Avaya Inc., Santa Clara, CA (US)

( * ) Notice: Subject to any disclaimer, the term of this patent is extended or adjusted under 35 U.S.C. 154(b) by 736 days.

(21) Appl. No.: 14/573,163

(22) Filed: Dec. 17, 2014

(65) Prior Publication Data
US 2016/0182718 A1   Jun. 23, 2016

(51) Int. Cl.
*H04M 3/51* (2006.01)

(52) U.S. Cl.
CPC ................ *H04M 3/5175* (2013.01)

(58) Field of Classification Search
CPC ................................... H04M 3/5175
USPC ......................................... 379/265.06
See application file for complete search history.

(56) References Cited

U.S. PATENT DOCUMENTS

| | | | | |
|---|---|---|---|---|
| 5,577,112 A | * | 11/1996 | Cambray | H04M 3/51 379/216.01 |
| 7,046,789 B1 | * | 5/2006 | Anderson | H04M 3/5175 379/265.01 |
| 7,091,471 B2 | * | 8/2006 | Wenstrand | G06F 1/3203 250/221 |
| 7,457,404 B1 | * | 11/2008 | Hession | G10L 15/26 379/265.07 |
| 7,562,305 B2 | * | 7/2009 | Need | G06F 9/4443 715/744 |
| 2002/0054587 A1 | * | 5/2002 | Baker | G06F 11/0709 370/352 |
| 2007/0282954 A1 | * | 12/2007 | Kim | G06Q 30/02 709/206 |
| 2014/0140497 A1 | * | 5/2014 | Ripa | H04M 3/5133 379/265.06 |

OTHER PUBLICATIONS

Johnston, Alan B. et al., "WebRTC: APIs and RTCWEB Protocols of the HTML5 Real-Time Web," 2nd Edition (2013 Digital Codex LLC), Jun. 2013, 254 pages.

\* cited by examiner

*Primary Examiner* — Ahmad F. Matar
*Assistant Examiner* — Jirapon Intavong
(74) *Attorney, Agent, or Firm* — Sheridan Ross P.C.

(57) ABSTRACT

Mechanisms for generating a metric message text stream, and a corresponding contact center command, in response to determining that a contact center metric value is not a desired value is disclosed. A metric value is obtained that quantifies a metric of a contact center. It is determined that the metric value is not a desired value. In response to determining that the metric value is not the desired value, generating a metric message text stream. A contact center action set is generated that comprises at least one contact center action that is associated with the metric message text stream. A metric message identifier (ID) is associated with the metric message text stream. The metric message ID and the contact center action set are stored in a storage, and the metric message text stream is communicated to a computing device.

21 Claims, 13 Drawing Sheets

CONTACT CENTER ADMINISTRATION VIA TEXT STREAM INTERACTION

TECHNICAL FIELD

The embodiments relate to contact centers, and in particular to contact center administration via text stream interaction.

BACKGROUND

A contact center handles relatively large numbers of inbound calls, and/or outbound calls, preferably in a relatively efficient manner. Typically, a contact center has desired metrics associated with quality of service, such as caller wait time, queue length, transfers per agent, and the like. It is common for a user, such as a supervisor or operator, to utilize a contact center management console to monitor the real-time metrics associated with a call center. If the metrics are undesirable, the user may take a certain action, such as activating more agents.

It is increasingly common for employees to work while mobile, which facilitates multi-tasking and other business goals. Devices utilized by mobile employees are increasingly designed with a reduced form factor as a primary goal, to reduce weight, bulk, and in many cases, costs. End-user devices that display information, however, have a competing need to provide a display that is legible to a user with average eyesight, limiting how small a display on such a device can be. In some cases, the display becomes a gating factor of the overall size of the device. Wearable devices, such as a watch, that are intended to be worn on a specific part of a human body inherently have very limited space for a display.

It is not practical to provide to a relatively small mobile device utilized by a contact center supervisor the information and choices that are available on a contact center management console. Accordingly, it can be difficult for a contact center supervisor to be mobile while still being responsible for monitoring and ensuring that desired contact center metrics are maintained.

SUMMARY

The embodiments relate to mechanisms for generating a metric message text stream, and a corresponding contact center command, in response to determining that a contact center metric value is not a desired value. The metric message text streams can be streamed to a user, such as a contact center supervisor, for presentation. In response to an action taken by the user, the corresponding contact center command may be performed. In some embodiments, a contact center command set that includes a plurality of different contact center commands, and a defined processing sequence that is dependent on a received response from the user, may be generated. Among other features, the embodiments facilitate an intuitive and, in some embodiments, hands-free mechanism for monitoring and controlling a contact center system via a mobile and/or wearable device.

In one embodiment, a metric value is obtained that quantifies a metric of a contact center. It is determined that the metric value is not a desired value. In response to determining that the metric value is not the desired value, a first metric message text stream is generated. A contact center action set is generated that comprises at least one contact center action that is associated with the first metric message text stream. A metric message identifier (ID) that is associated with the first metric message text stream is determined. The metric message ID and the contact center action set are stored in a storage, and the first metric message text stream is sent to a computing device.

In one embodiment, the metric value identifies one of a caller wait time, a number of caller transfers, and a rate of abandonment.

In one embodiment, determining that the metric value is not the desired value comprises one of determining that the metric is not within a predetermined range of values, determining that the metric value is below a predetermined threshold, and determining that the metric value is above a predetermined threshold.

In one embodiment, the first metric message text stream is generated by determining a metric message template associated with the metric and by generating the first metric message text stream based on the metric message template and the metric.

In one embodiment, a message response is received, and it is determined that the message response is associated with the contact center action set. The contact center action set is accessed, and the at least one contact center action is performed based on the message response.

In one embodiment, the contact center action set is generated by accessing a contact center action template associated with the metric and by generating the contact center action set based on the contact center action template.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
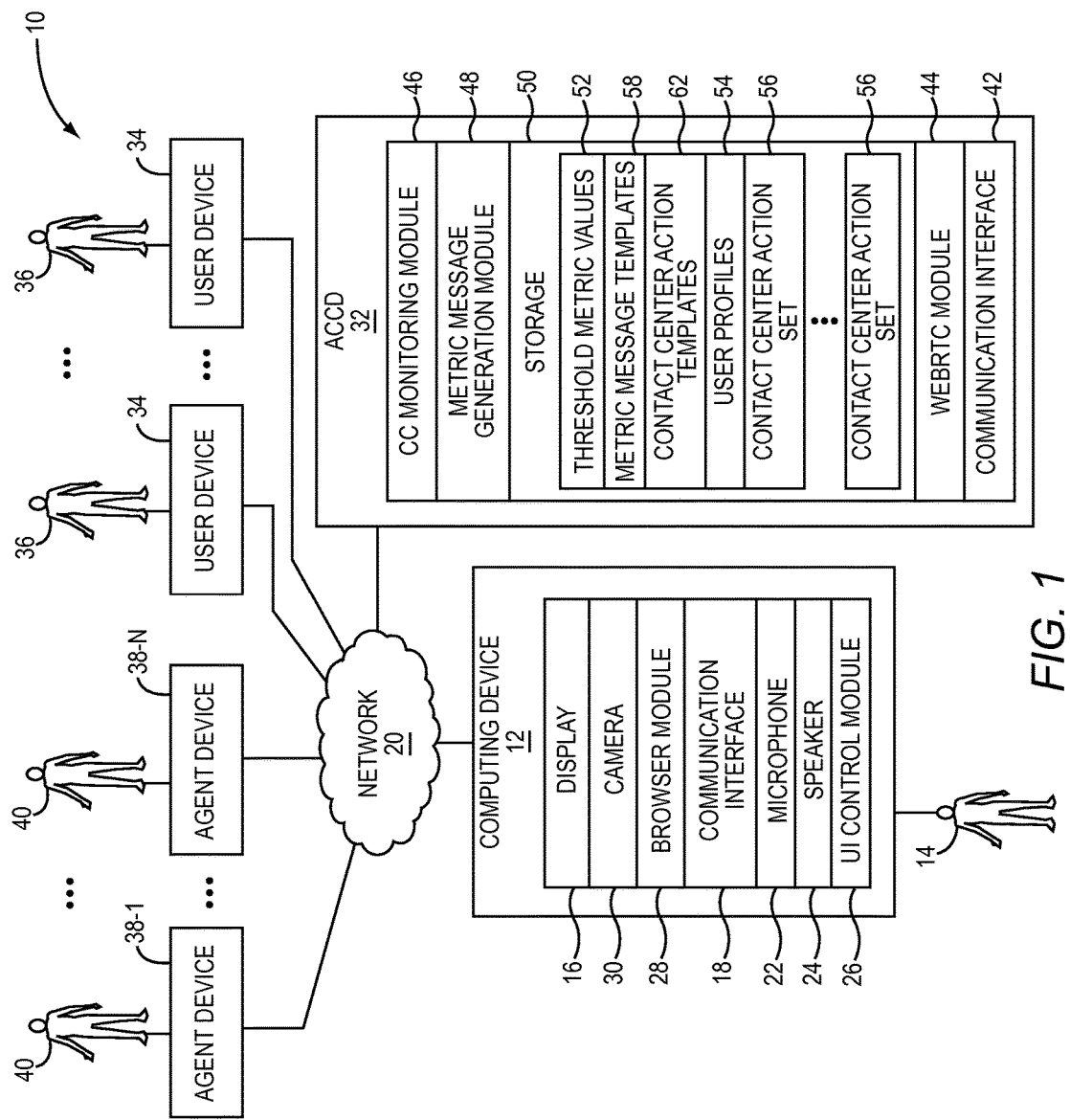
FIG. 1 is a block diagram of a system in which embodiments may be practiced according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein.

Some embodiments may optionally utilize Web Real-Time Communications (WebRTC) to implement certain functionality disclosed herein. WebRTC is a set of standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, 2nd Edition (2013 Digital Codex LLC), which is incorporated herein by reference in its entirety.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF).

To establish a WebRTC interactive flow (e.g., a real-time video, audio, and/or data exchange), two WebRTC clients may retrieve WebRTC-enabled web applications, such as HTML5/JavaScript web applications, from a web application server. Through the web applications, the two WebRTC clients then engage in a dialogue for initiating a peer connection over which the WebRTC interactive flow will pass. The peer connection initiation dialogue includes any data transmitted between the two WebRTC clients and/or the web application server facilitating the establishment of the WebRTC interactive flow. As non-limiting examples, the peer connection initiation dialogue may include WebRTC session description objects, HTTP header data, certificates, cryptographic keys, and/or network routing data. The peer connection initiation dialogue may also include a media negotiation to communicate and reach an agreement on parameters that define characteristics of the WebRTC interactive flow.

In some embodiments, the media negotiation may be implemented via a WebRTC offer/answer exchange. A WebRTC offer/answer exchange typically occurs via a secure network connection such as a Hypertext Transfer Protocol Secure (HTTPS) connection or a Secure WebSockets connection. In a WebRTC offer/answer exchange, a first WebRTC client on a sender computing device sends an "offer" to a second WebRTC client on a recipient computing device. The offer includes a WebRTC session description object that specifies media types and capabilities that the first WebRTC client supports and prefers for use in the WebRTC interactive flow. The second WebRTC client then responds with a WebRTC session description object "answer" that indicates which of the offered media types and capabilities are supported and acceptable by the second WebRTC client for the WebRTC interactive flow. It is to be understood that the peer connection initiation dialogue may employ mechanisms other than a WebRTC offer/answer exchange to establish a WebRTC interactive flow between WebRTC clients.

Once the peer connection initiation dialogue is complete, the WebRTC clients may then establish a direct peer connection with one another, and may begin an exchange of media or data packets transporting real-time communications. The peer connection between the WebRTC clients typically employs the Secure Real-time Transport Protocol (SRTP) to transport real-time media flows, and may utilize various other protocols for real-time data interchange.

FIG. 1 is a block diagram of a system 10 according to one embodiment. The system 10 includes a computing device 12. The computing device 12 may offer a user 14 any desired functionality, or functionalities, and may comprise, by way of non-limiting example, a smartphone, a computing tablet, a fitness device, a timekeeping device, a news or information device, or the like. In some embodiments, the computing device 12 may be a wearable device, such as may be worn on a body part, such as a wrist, or on the face in the form of wearable headgear, such as Google Glass. In some embodiments, the computing device 12 may have a very small form factor that is dictated primarily by the size of a display 16, on which textual information, in the form of a text stream, may be presented to the user 14. In some embodiments, the display 16 may have input controls, such as touch screen capabilities, one or more buttons, dials, or the like, to facilitate the receipt of inputs from the user 14. In the examples discussed herein, the user 14 is an operator or supervisor of a contact center.

The computing device 12 includes one or more communication interfaces 18 that facilitate communications with a network 20 using any desired communication technology, such as, by way of non-limiting example, cellular wireless technologies, local area network wireless technologies, such as Wi-Fi®, or other wireless technologies such as Bluetooth®, ZigBee®, or the like. Alternatively, the computing device 12 may interact with a local device, such as a smartphone, which has network access to the network 20. The network 20 may comprise any proprietary or public network, or combination thereof, that facilitates communications between the various elements discussed herein.

The computing device 12 may also include a microphone 22, and/or an input port to facilitate the connection of the microphone 22 thereto, to enable the computing device 12 to process sounds, such as a voice of the user 14. Similarly, the computing device 12 may include a speaker 24, or an output port to facilitate the connection of the speaker 24 thereto, to enable the computing device 12 to emit sounds, such as a voice of a called party, to the user 14.

The computing device 12 may also include a user interface (UI) control module 26 that may provide certain functionality, as described in greater detail herein, in response to inputs of the user 14. The inputs may be provided by the user 14 via any one or more of a variety of different mechanisms, such as, by way of non-limiting example, voice, soft buttons implemented via a touch screen, mechanical buttons or other "hard" input mechanisms implemented on the computing device 12 (not illustrated), and the like. In some embodiments, as will be discussed in greater detail herein, the computing device 12 may include a browser module 28 that facilitates some of the functionality described herein. In some embodiments, the computing device 12 includes a viewer-facing camera 30 that can generate video imagery at a framerate, such as 30 or 60 frames per second as non-limiting examples, of a desired scene, including, for example, an eye system of the user 14, as will be discussed in greater detail herein.

The system 10 also includes an automated contact center device (ACCD) 32. Among other features, in an in-bound mode, the ACCD 32 operates to receive calls from user devices 34 associated with individuals 36 who seek some type of information, such as customer support. The ACCD 32 facilitates a connection between the user devices 34 and agent devices 38-1-38-N (generally, agent devices 38) so that a particular agent 40 can provide the desired support to the user 14. The term "call" as used herein is not limited to traditional voice calls, and includes any type of interactive session request that may be used to initiate, or establish, an interactive session, which may comprise, by way of non-limiting example, a voice session, a video session, a text chat session, or the like. The ACCD 32 includes one or more communication interfaces 42 that facilitate communications with the network 20 using any desired communication technology. In some embodiments, the ACCD 32 may communicate, at least in part, with the computing device 12 via the WebRTC protocol. The ACCD 32 may implement the WebRTC protocol via a WebRTC module 44 that communicates with the browser module 28 that executes on the computing device 12. However, it is noted that the communications discussed herein between the computing device 12 and the ACCD 32 may be implemented using any desired protocol or suite of protocols, and the embodiments are not limited to the use of the WebRTC protocol or any specific WebRTC interaction format or technology.

The ACCD 32 includes a contact center (CC) monitoring module 46 that monitors various metrics of the contact center on an ongoing basis. The metrics may comprise any number of different operational attributes or characteristics of the contact center, including, by way of non-limiting example, an average wait time of an individual 36 before being serviced, a number of caller transfers, a rate of abandonment, the number of contacts queuing, agent staffing levels, agents available, a line of business service level, a queue service level, a number of agents in a not ready state, and agent conformance to regulatory policy.

The CC monitoring module 46 may periodically determine metric values that quantify the current state of the respective metric, and, if a metric value is not desirable, notify a metric message generation module 48 to generate a metric message text stream that can be communicated to the computing device 12 and presented to the user 14. While certain examples have been provided, the embodiments are not limited to any particular metric, and can include any observable operational characteristic of a contact center.

The ACCD 32 also includes, or is communicatively coupled to, a storage 50, such as a hard-drive or network-attached storage device, which is configured to store various data. The storage 50 may include threshold metric values 52, which identify desired metric values for the contact center. The CC monitoring module 46 may access the threshold metric values 52 for use in determining when to trigger the generation of a metric message text stream by the metric message generation module 48. Alternatively, the CC monitoring module 46 may access a user profile 54 associated with the user 14 to determine threshold metric values 52 for use in triggering the generation of a metric message text stream.

The metric message generation module 48 accesses various information in the storage 50 that facilitates the generation of a metric message text stream for presentation to the user 14, as well as the generation of a contact center action set 56 that is associated with a particular metric message text stream. For example, based on the particular metric associated with the metric value, a corresponding metric message template 58 may be accessed. The metric message template 58 may contain text and parameters utilized to generate a respective metric message text stream. The user profile 54 that corresponds to the user 14 may also be accessed and utilized in generating the metric message text stream. The metric message text stream contains information that informs the user 14 that the metric value is undesirable.

The metric message generation module 48 also generates a contact center action set 56 that corresponds to the respective metric message text stream. The metric message generation module 48 may access one or more contact center action templates 62 for use in generating the contact center action set 56, as discussed in greater detail herein. The contact center action set 56 comprises at least one contact center action that may be initiated, or otherwise performed, in response to an action of the user 14 upon being presented with the metric message text stream.

In one embodiment, the metric message generation module 48 determines a metric message identifier (ID) that is associated with a generated metric message text stream. The metric message ID may comprise any suitable value, such as a randomly or sequentially generated unique number. The metric message ID may be stored in the storage 50 in association with the corresponding contact center action set 56 that is associated with the metric message text stream.

In one embodiment, the metric message generation module 48 streams, or otherwise sends, the metric message text stream and the metric message ID to the computing device 12. The computing device 12 streams, or scrolls, the metric message text stream to the user 14. In some embodiments, the display 16 has a limited capacity and may be sized such that only one or two text components, such as words or characters, may be scrolled across the display 16 at one time. In such embodiments, the ACCD 32 generates the metric message text stream for rendering text components of the metric message text stream consecutively as time progress on the display 16 of the computing device 12.

The user 14 either accepts (A) the metric message text stream or rejects (R) the metric message text stream. The acceptance or rejection may be accomplished in any desired manner, such as, by way of non-limiting example, selecting a hard or soft button of the computing device 12, or otherwise interacting with the computing device 12. A rejection may also be indicated by the failure of the user 14 to access the metric message text stream within a predetermined amount of time after the metric message text stream is presented to the user 14. In some embodiments, the particular respective actions of the user 14 that constitute an acceptance and a rejection may be defined in the user profile 54 associated with the user 14.

The computing device 12 provides the ACCD 32 a message that identifies the action that the user 14 made in response to the metric message text stream and to the metric message ID. The ACCD 32 uses the metric message ID to access the appropriate contact center action set 56 in the storage 50. If the contact center action set 56 comprises a single contact center action and if the action was an acceptance, then the ACCD 32 performs the contact center action identified in the contact center action set 56, and then removes the contact center action set 56 from the storage 50. If the action was a rejection, the ACCD 32 may simply remove the contact center action set 56 from the storage 50. In some embodiments, the metric message ID need not be communicated to the computing device 12, because the metric message ID may comprise a value that is automatically associated with a communication from the computing device 12, such as an internet protocol (IP) source address, a media access control (MAC) address, or some other identifier that identifies the source of the message as the computing device 12.

In this manner, among other advantages, the embodiments facilitate a mechanism that dynamically generates one or more contact center actions in response to a determined problem within the contact center that can be triggered by the user 14 by merely indicating an acceptance of the metric message text stream. The user 14 need not type or otherwise interact with the computing device 12 to cause the initiation of the contact center action, freeing the user 14 from a contact center management console and facilitating the use of a computing device 12 that has a display 16 of limited size.

Figure 2A:
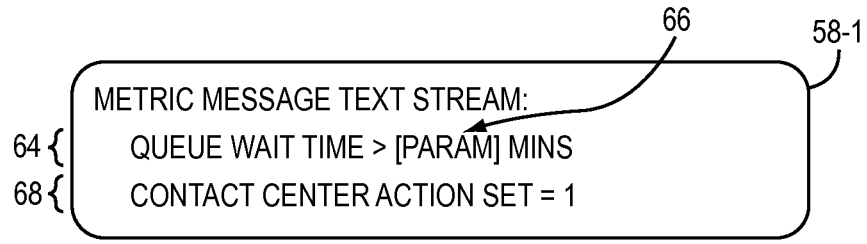
FIG. 2A is a block diagram of a metric message template according to one embodiment.

FIG. 2A is a block diagram of a metric message template 58-1 associated with a queue wait time metric of the contact center according to one embodiment. Assume that the ACCD 32 determines that the queue wait time metric value is not desirable. The particular metric threshold for determining that the queue wait time metric value is undesirable may be, for example, associated with the particular user 14 and obtained from the user profile 54 associated with the user 14, and/or may be associated with the contact center and may be a value stored in a configuration parameter maintained in the storage 50. Upon such determination, the ACCD 32 may access a metric message template 58-1 that is associated with the queue wait time metric. In one embodiment, the particular metric message template 58 that is associated with a particular metric may be identified in the user profile 54 of the user 14 such that, for the same metric, the ACCD 32 may access different metric message templates 58 based on the particular user 14.

The metric message template 58-1 includes example text 64 for use in generating a metric message text stream for presentation to the user 14. The text 64 includes a parameter 66 that identifies the particular metric threshold that has been exceeded. A contact center action set identifier 68 identifies a particular contact center action template 62 that may be used to dynamically generate a contact center action set 56 for the respective metric message text stream. In this example, the ACCD 32 generates a metric message text stream for presentation to the user 14 that includes the text "QUEUE WAIT TIME>5 MINS."

Figure 2B:
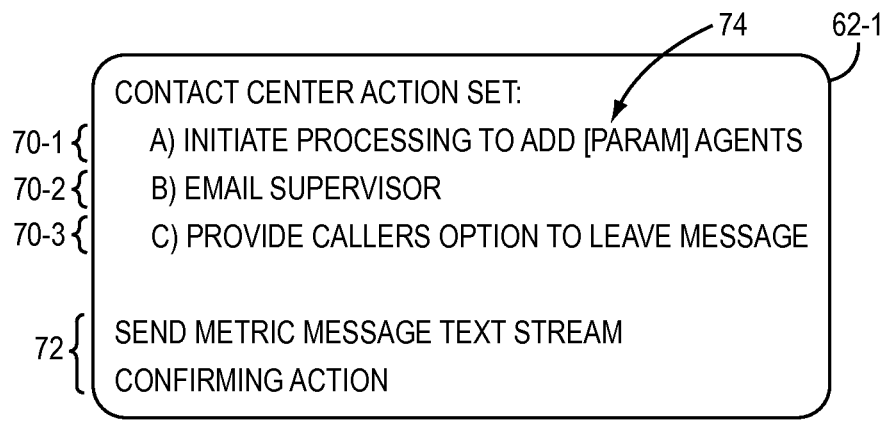
FIG. 2B is a block diagram of a contact center action template, according to one embodiment.

FIG. 2B is a block diagram of a contact center action template 62-1 according to one embodiment. In this example, the contact center action template 62-1 was the particular contact center action template 62 referred to by the metric message template 58-1 illustrated in FIG. 2A. The contact center action template 62-1 contains three potential contact center actions 70-1-70-3 that may be performed in response to an acceptance by the user 14 of the associated metric message text stream generated as discussed above with regard to FIG. 2A. The contact center action template 62-1 also includes a confirmation metric message text stream 72 that is to be sent to the user 14 upon performance of the contact center action 70.

Assume that the ACCD 32 accesses the user profile 54 associated with the user 14, and the user profile 54 indicates, for this particular metric, that the contact center action 70-1 should be implemented. The ACCD 32 accesses, for example, the user profile 54 to determine the value of a parameter 74 that identifies the number of agents 40 that are to be added in response to an acceptance by the user 14 of the metric message text stream. For purposes of illustration, assume that the value of the parameter 74 is determined to be five.

Figure 2C:
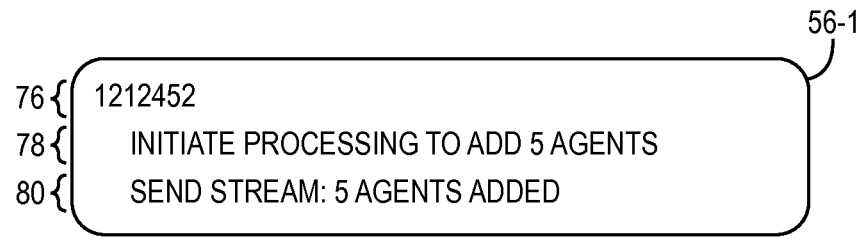
FIG. 2C is a block diagram of a contact center action set according to one embodiment.

FIG. 2C is a block diagram of an example contact center action set 56-1 that is generated by the ACCD 32 based on the contact center action template 62-1 discussed above with regard to FIG. 2B. The contact center action set 56-1 contains a metric message ID 76 that associates the contact center action set 56-1 with the particular metric message text stream presented to the user 14. The contact center action set 56-1 also includes a contact center action 78 that identifies the action to be taken by the ACCD 32 if the user 14 accepts the metric message text stream. The contact center action set 56-1 also includes a contact center action 80 that indicates a confirmation metric message text stream will be provided to the user 14 indicating that the contact center action 78 was performed.

Figure 3A:
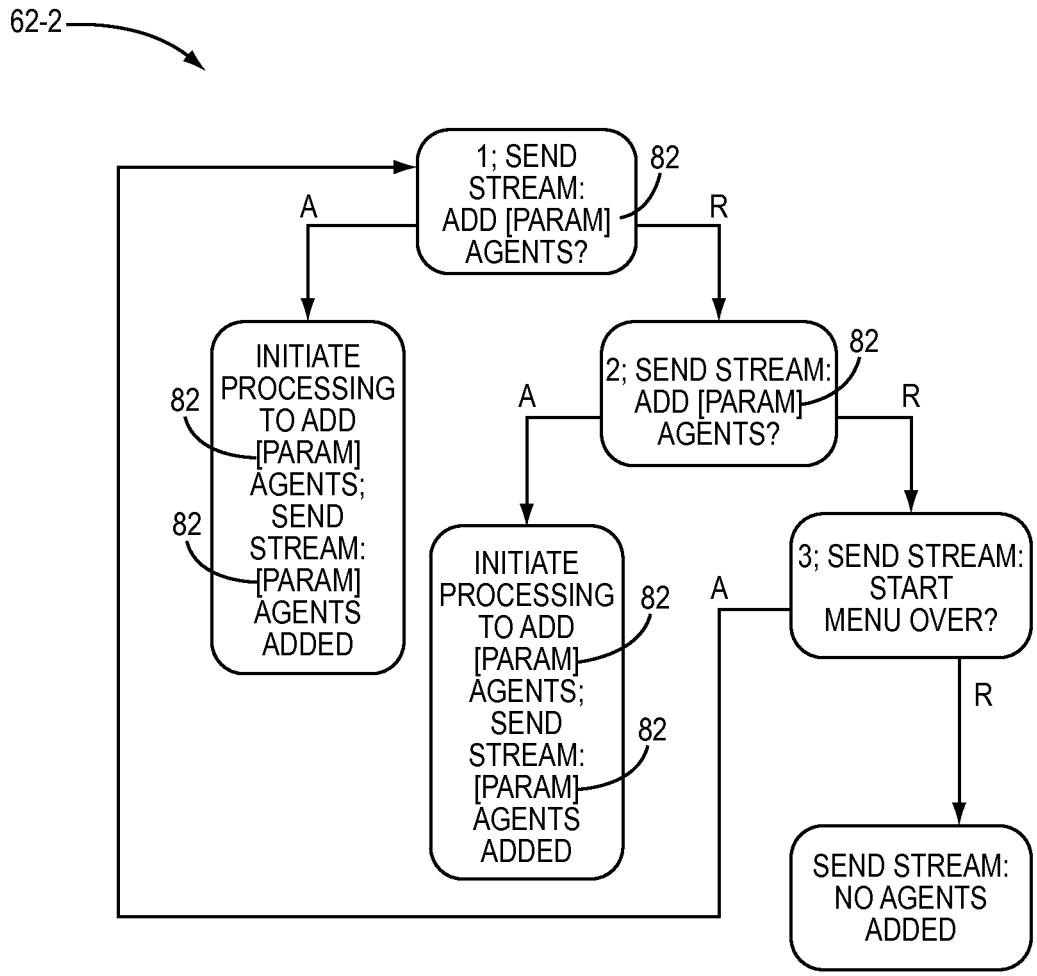
FIG. 3A is a block diagram of a contact center action template according to another embodiment.
Figure 3B:
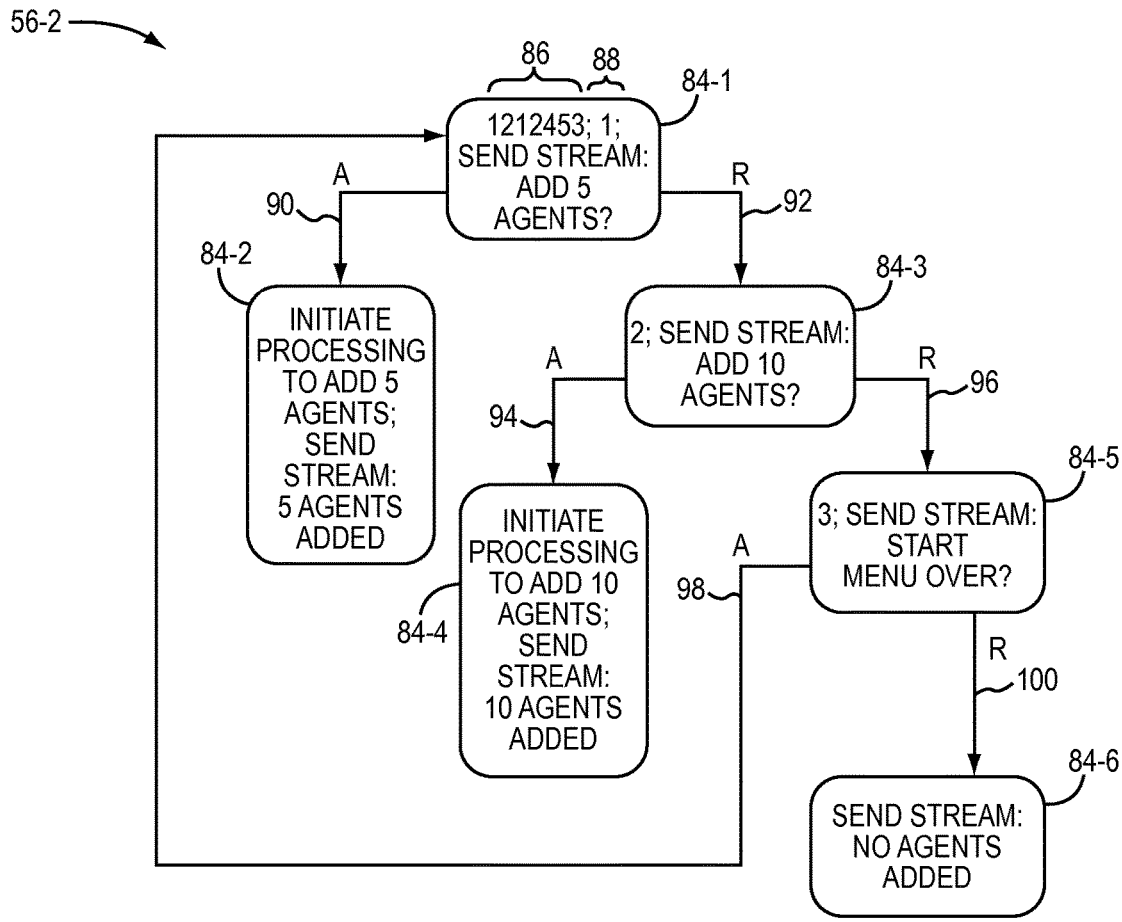
FIG. 3B is a block diagram of a contact center action set generated based on the contact center action template illustrated in FIG. 3A.

FIG. 3A is a block diagram of a contact center action template 62-2 according to another embodiment. In this embodiment, the contact center action template 62-2 results in a contact center action set 56 that includes a plurality of potential contact center actions, and provides a processing sequence through the plurality of potential contact center actions. Utilizing the contact center action template 62-2, the ACCD 32 generates a contact center action set 56-2 that is illustrated in FIG. 3B. The contact center action template 62-2 includes a plurality of parameters 82, each of which may be obtained, for example, from the user profile 54 associated with the user 14.

FIG. 3B is a block diagram of a contact center action set 56-2 generated based on the contact center action template 62-2 illustrated in FIG. 3A. The contact center action set 56-2 includes a plurality of potential contact center actions 84-1-84-6 that have a defined processing sequence that is dependent on a received response from the user 14. For purposes of illustration, assume that the ACCD 32 has sent a metric message text stream to the computing device 12 for presentation to the user 14 that includes the message "QUEUE WAIT TIME>5 MINS." The ACCD 32 also determines a metric message ID 86 that is associated with the metric message text stream, and associates the metric message ID 86 with the contact center action set 56-2 by storing the metric message ID 86 in conjunction with the contact center action set 56-2. The ACCD 32 may maintain a current sequence location value that identifies a current processing sequence of the contact center action set 56-2. The ACCD 32 initially sets the current sequence location value to a value of 0 to indicate that no processing of the contact center action set 56-2 has taken place.

Assume that the user 14 accepts the metric message text stream, and the computing device 12 sends the ACCD 32 a message indicating that the user 14 has accepted the metric message text stream and sends the ACCD 32 the metric message ID 86. The ACCD 32, using the metric message ID 86, accesses the contact center action set 56-2 and determines that the current sequence location is 0. The ACCD 32 thus performs the contact center action 84-1. The contact center action 84-1 indicates that a metric message text stream that contains the text "ADD 5 AGENTS?" is to be sent to the computing device 12 for presentation to the user 14. The ACCD 32 thus generates the metric message text stream and sends the metric message text stream to the computing device 12 for presentation to the user 14. The ACCD 32 also updates the current sequence location to a value of 1.

Assume again that the user 14 rejects the metric message text stream, and the computing device 12 sends the ACCD 32 a message indicating that the user 14 has rejected the metric message text stream and sends the ACCD 32 the metric message ID 86. The ACCD 32, using the metric message ID 86, accesses the contact center action set 56-2 and determines that the current sequence location is 1. The ACCD 32 determines that a processing sequence location field 88 of the contact center action 84-1 is 1. Thus, the ACCD 32 determines that the contact center action 84-1 has already been performed, and that the response from the user 14 is in response to the contact center action 84-1. The contact center action 84-1 contains an accept link 90 that refers to a contact center action 84-2 that is to be performed by the ACCD 32 in the event the user 14 accepts the metric message text stream, and a reject link 92 that refers to a contact center action 84-3 that is to be performed by the ACCD 32 in the event the user 14 rejects the metric message text stream. Because the user 14 rejected the metric message text stream, the ACCD 32 follows the reject link 92 and performs the contact center action 84-3, and updates the current sequence location to a value of 2.

The contact center action 84-3 contains an accept link 94 that refers to a contact center action 84-4 that is to be performed by the ACCD 32 in the event the user 14 accepts the metric message text stream, and a reject link 96 that refers to a contact center action 84-5 that is to be performed by the ACCD 32 in the event the user 14 rejects the metric message text stream. Similarly, the contact center action 84-5 contains an accept link 98 that refers to the contact center action 84-1 that is to be performed by the ACCD 32 in the event the user 14 accepts the metric message text stream. In this example, if, after the ACCD 32 performs the actions identified in the contact center action 84-5, the user 14 accepts the metric message text stream, the accept link 98 starts the processing sequence over beginning with the contact center action 84-1. If the user rejects the metric message text stream, the ACCD 32 follows the reject link 100 and performs the contact center action 84-6. Specifically, the ACCD 32 generates a metric message text stream that indicates no agents have been added. The ACCD 32, after performing any of the contact center actions 84-2, 84-4, or 84-6, may then remove the contact center action set 56-2 from the storage 50.

Figure 4:
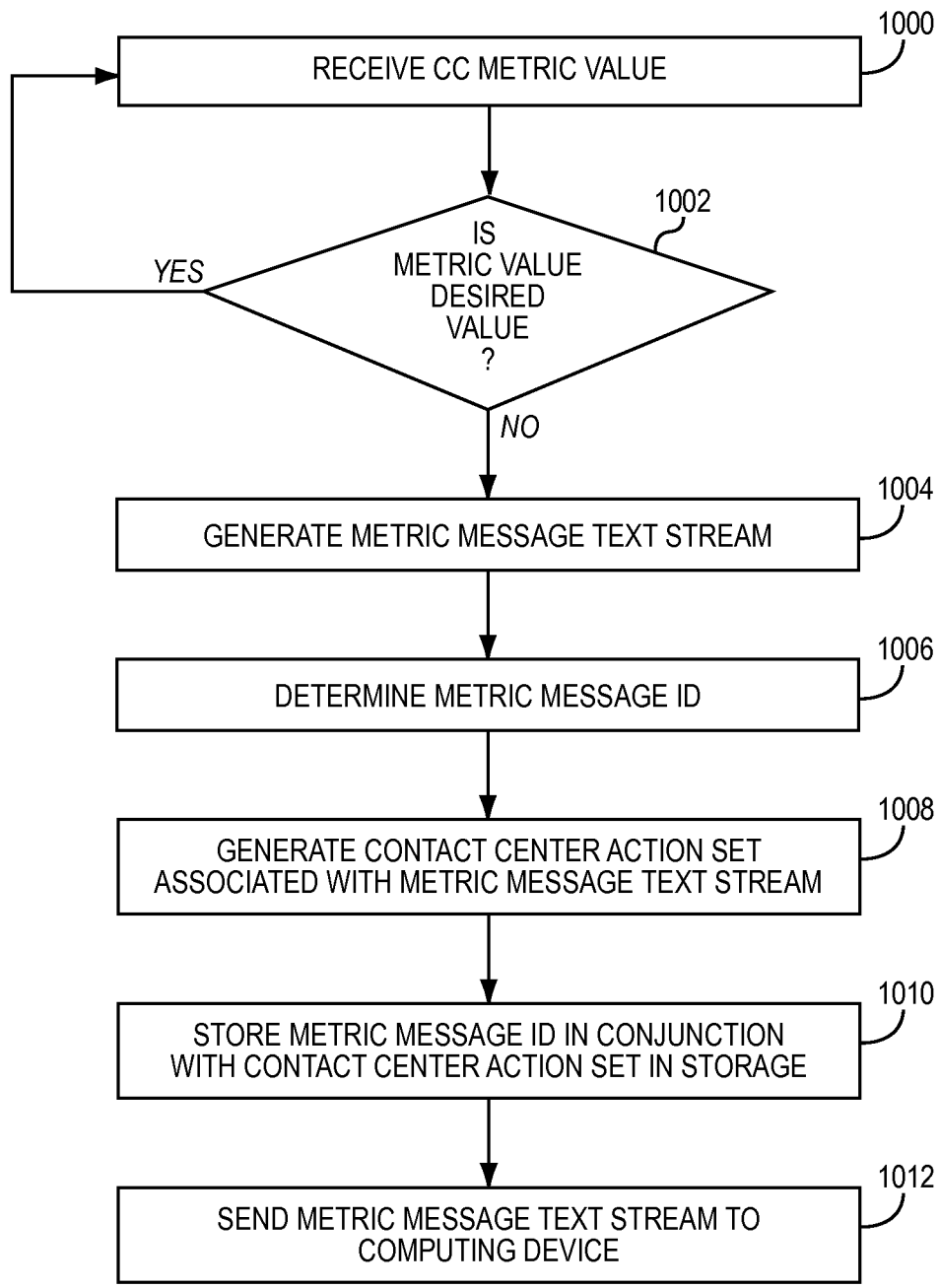
FIG. 4 is a flowchart of a method for generating a metric message text stream and associated contact center action set according to one embodiment.

FIG. 4 is a flowchart of a method for generating a metric message text stream and associated contact center action set 56 according to one embodiment. FIG. 4 will be discussed in conjunction with FIG. 1. The ACCD 32 obtains a contact center metric value that quantifies a metric of the contact center (FIG. 4, block 1000). The ACCD 32 may obtain the contact center metric value, for example, via the CC monitoring module 46. Alternatively, the ACCD 32 may obtain the contact center metric value from a computing device that is configured to analyze various metrics of the contact center continuously and in real-time. The ACCD 32 determines whether the contact center metric value is a desired value (FIG. 4, block 1002). The contact center metric value may be an undesired value if the contact center metric value is not within a predetermined range of values, or is below a predetermined threshold value, or is above a predetermined threshold value. The predetermined range of values or predetermined threshold values may be configured by an operator and stored as a threshold metric value 52 in the storage 50. In some embodiments, the predetermined range of values or predetermined threshold values may be obtained from the user profile 54 associated with the computing device 12.

If the contact center metric value is an undesired value, the ACCD 32 generates a metric message text stream that identifies the metric for presentation to the user 14 (FIG. 4, block 1004). The ACCD 32 also generates a metric message ID associated with the metric message text stream (FIG. 4, block 1006). The ACCD 32 dynamically generates a contact center action set 56 (FIG. 4, block 1008). The ACCD 32 stores the metric message ID in conjunction with the contact center action set 56 in the storage 50 (FIG. 4, block 1010). The ACCD 32 sends the metric message text stream to the computing device 12 for presentation to the user 14 (FIG. 4, block 1012).

Figure 5:
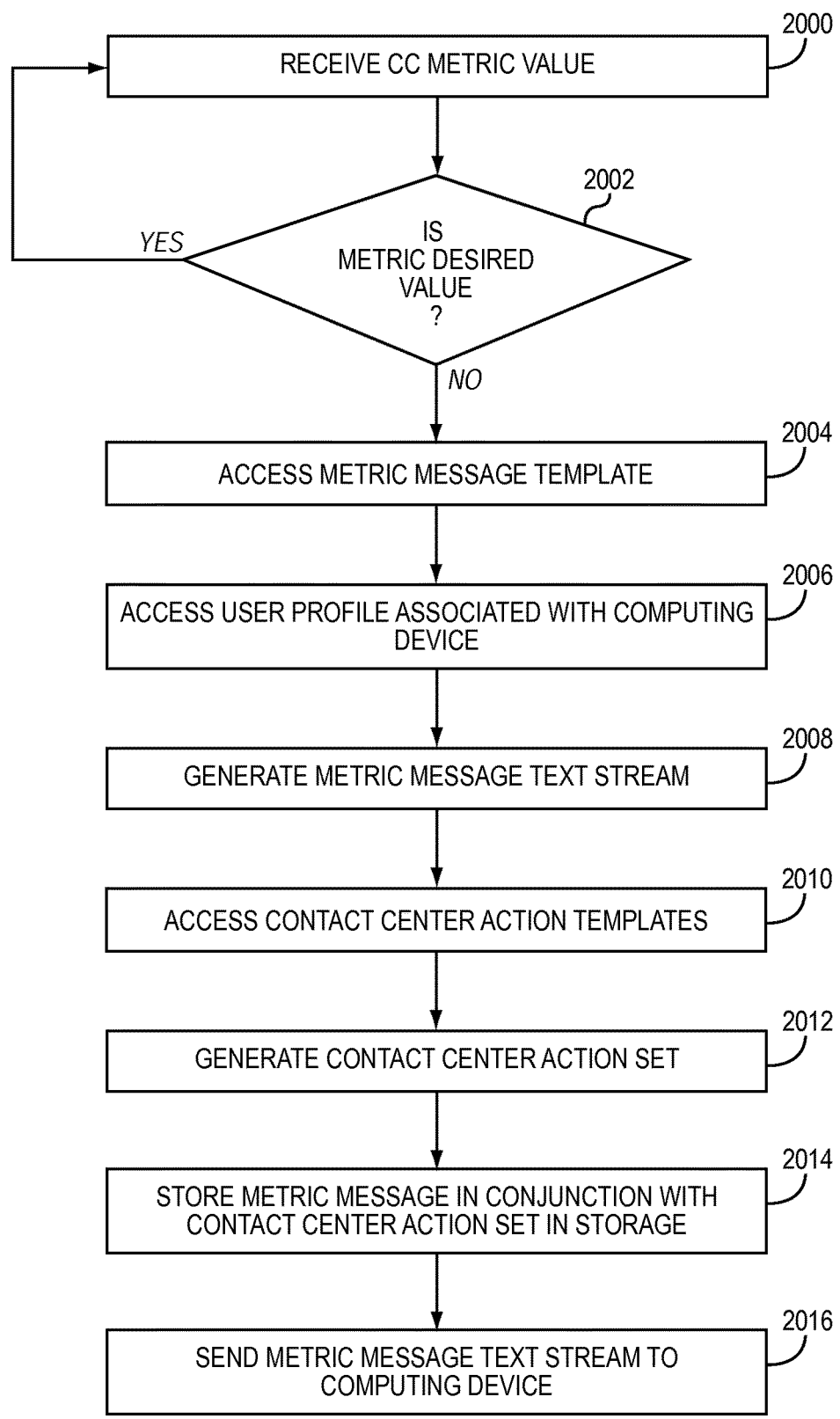
FIG. 5 is a flowchart of the method for generating a metric message text stream and associated contact center action set according to one embodiment.

FIG. 5 is a flowchart of the method for generating a metric message text stream and associated contact center action set 56 discussed above with regard to FIG. 4 in greater detail, according to one embodiment. FIG. 5 will be discussed in conjunction with FIG. 1. As discussed above with regard to FIG. 4, the ACCD 32 obtains a contact center metric value that quantifies a metric of the contact center, and determines whether the contact center metric value is a desired value (FIG. 5, blocks 2000-2002). If the contact center metric value is an undesired value, the ACCD 32 accesses a metric message template 58 that is associated with the metric (FIG. 5, block 2004).

The ACCD 32 accesses the user profile 54 of the user 14 (FIG. 5, block 2006). The ACCD 32 generates a metric message text stream based on the metric message template 58 and the user profile 54 of the user 14 (FIG. 5, block 2008). The ACCD 32 accesses a contact center action template 62, and generates a contact center action set 56 (FIG. 5, blocks 2010-2012). The ACCD 32 determines a metric message ID and stores the metric message ID in conjunction with the contact center action set 56 in the storage 50 (FIG. 5, block 2014). The ACCD 32 sends the metric message text stream to the computing device 12 for presentation to the user 14 (FIG. 5, block 2016).

Figure 6:
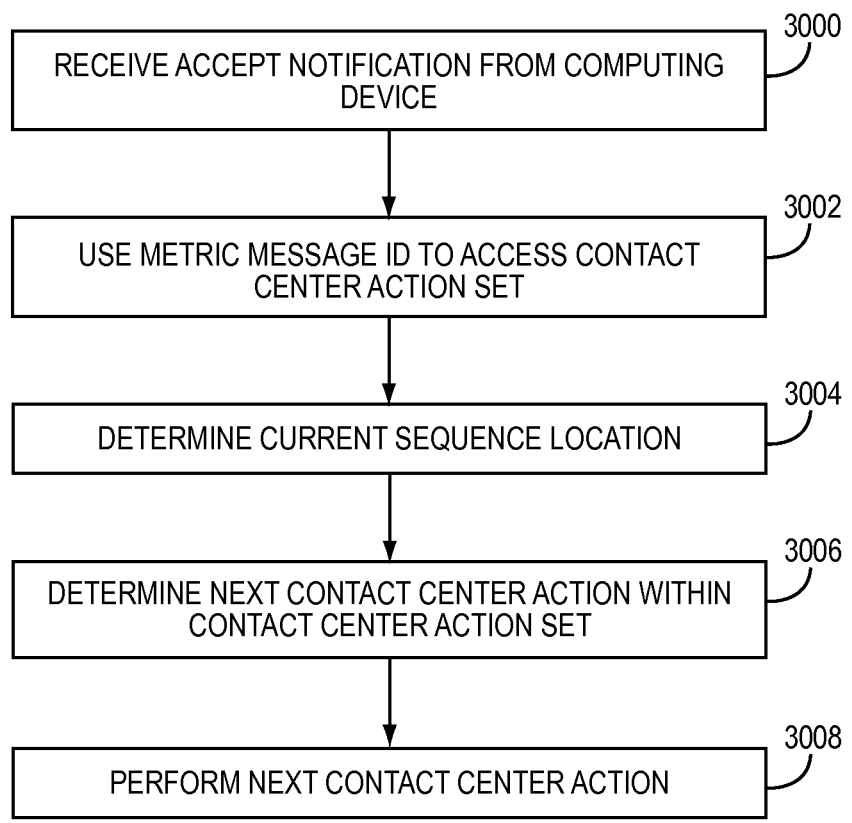
FIG. 6 is a flowchart of a method for initiating a contact center action in response to an action of a user after viewing a metric message text stream according to one embodiment.

FIG. 6 is a flowchart of a method for initiating a contact center action in response to an action of the user 14 after viewing a metric message text stream according to one embodiment. FIG. 6 will be discussed in conjunction with FIG. 1. Assume that the computing device 12 has presented the metric message text stream to the user 14, and has received a response that indicates an acceptance. The computing device 12 provides an accept notification message indicating the acceptance and the metric message ID associated with the metric message text stream to the ACCD 32. The ACCD 32 receives the accept notification, from the computing device 12, and uses the metric message ID to access the corresponding contact center action set 56 in the storage 50 (FIG. 6, blocks 3000-3002). The ACCD 32 determines the next contact center action based on the current sequence location (FIG. 6, block 3004-3006). The ACCD 32 performs the next contact center action.

Figure 7:
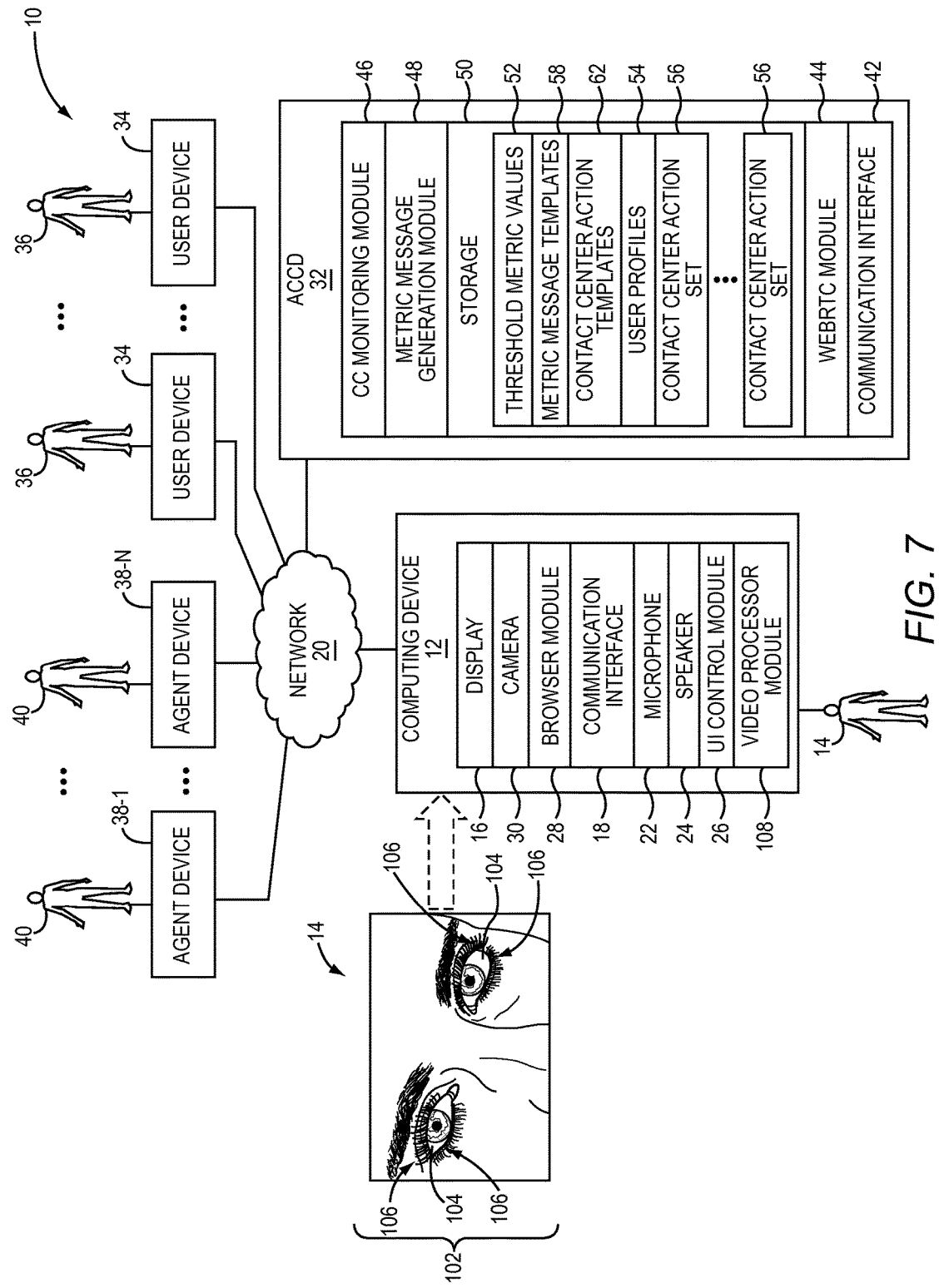
FIG. 7 is a block diagram of the system illustrated in FIG. 1 according to another embodiment.

FIG. 7 is a block diagram of the system 10 illustrated in FIG. 1 according to another embodiment. In this embodiment, the viewer-facing camera 30 can generate video imagery of an eye system 102 of the user 14. The eye system 102 may include one or two eyes 104, and corresponding eyelids 106. In operation of the computing device 12, a front lens of the camera 30 is oriented in a direction toward the user 14 to facilitate capturing the eye system 102 when the user 14 is viewing the display 16. To facilitate eye control detection in low light conditions, the computing device 12 may include a light source that is not disruptive to the user 14, such as an infrared (IR) light source, to illuminate the eye system 102. The camera 30 may include a sensor that is sensitive to photons in both visible wavelengths as well as IR wavelengths, and thus be capable of capturing the eye system 102 under normal lighting conditions, as well as reflections of IR energy in low light conditions.

A video processor module 108 is coupled to the camera 30 and is configured to process the video imagery and identify movements of the eye system 102. Such movements may comprise any desired actions, including, by way of non-limiting example, changing a direction of a gaze of any eye 104, such as right-to-left or up-to-down, closing of a single eyelid 106 or both eyelids 106 for a predetermined period of time, blinking an eyelid 106 a predetermined number of times within a predetermined period of time, or the like. While several examples have been provided, the embodiments are not limited to any particular movements of the eye system 102, and the video processor module 108 may be configured to detect and identify any desired movement of the eye system 102.

The UI control module 26 receives, from the video processor module 108, the identification of a particular eye control movement, and translates the eye control movement into a control command. Such control commands can be used to effect the presentation of the metric message text stream by the computing device 12, and can indicate acceptance or rejection of the metric message text stream by the user 14. Control commands may comprise, by way of non-limiting example, an accept control command, a reject control command, a pause control command, a continue control command, an increase pace control command, a decrease pace control command, and a back up control command. It will be appreciated that the control commands provided herein are merely examples, and any desired manipulation of text provided on the display 16 may be implemented by the UI control module 26.

In one embodiment, the video processor module 108 may identify to the UI control module 26 a detected eye movement with a predetermined value that is passed or otherwise provided to the UI control module 26. As an example, the UI control module 26 may receive a numeric value of 2 from the video processor module 108 that indicates, for example, that the video processor module 108 detected that an eyelid 106 of the user 14 remained closed for three seconds. The UI control module 26 may translate this eye control movement into a pause control command, and thereafter, the computing device 12 may immediately pause the current metric message text stream being presented on the display 16.

The video processor module 108 analyzes the eye system 102 of the user 14 while text components of the metric message text stream are concurrently being provided for presentation on the display 16 to determine if the eye system 102 has initiated a control command. Specifically, the video processor module 108 is configured to detect a change in direction of a gaze of one or both eyes 104, and/or movement of the eyelids 106. The video processor module 108 then identifies such eye control movement to the UI control module 26. The UI control module 26 translates, or otherwise determines, a particular control command based on the eye control movement. Control commands can indicate acceptance or rejection of the metric message text stream, or change characteristics of how the metric message text stream is presented on the display 16 and can comprise, by way of non-limiting example, pausing the text components, continuing the text components (when previously paused), increasing a pace at which the text components are provided on the display 16, decreasing a pace at which the text components are provided on the display 16, and backing up to an earlier location of the metric message text stream. Once a control command is received, the computing device 12 alters the presentation of the text components in accordance with the control command. In this manner, the computing device 12 facilitates eye control of the metric message text stream in a manner that is intuitive, requires very little physical space of the computing device 12, and does not require physical manipulation by the user 14 of the computing device 12.

In one embodiment, the computing device 12 may determine that the user 14 has shifted her gaze away from the display 16 while being presented with a metric message text stream. The computing device 12 may automatically pause the metric message text stream. After it is detected that the user 14 has shifted her gaze back to the display 16, the computing device 12 automatically restarts the presentation of the metric message text stream. If, after a predetermined period of time after the metric message text stream has been presented to the user 14 the user 14 has not indicated an acceptance, the computing device 12 may send a message to the ACCD 32, along with the metric message ID indicating that the user 14 has rejected the metric message text stream. In other embodiments, an affirmative action may be required by the user 14 to either accept or reject the metric message text stream. For example, the user 14 may blink her eyes twice in rapid succession to indicate an acceptance of the metric message text stream, and close her eyes for a predetermined amount of time to indicate a rejection of the metric message text stream.

Figure 8:
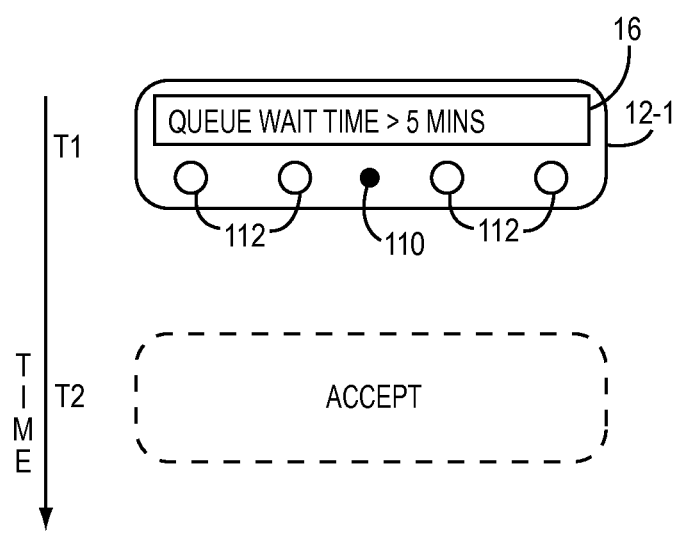
FIG. 8 is a block diagram illustrating a computing device at a plurality of successive times according to one embodiment.

FIG. 8 is a block diagram illustrating a computing device 12-1 at a plurality of successive times according to one embodiment. The computing device 12-1 is substantially similar to the computing device 12 discussed above, except as otherwise discussed herein. The computing device 12-1 includes a front lens 110 that facilitates the generation of imagery of the eye system 102 by the camera 30 (not illustrated). The computing device 12-1 includes a plurality of input controls 112 that may be utilized by the user 14 to indicate acceptance or rejection of a metric message text stream. Alternatively, the user 14 may issue a control command through an eye movement. Assume as discussed above that the ACCD 32 (FIG. 1) has generated a metric message text stream and metric message ID and communicated the metric message text stream and metric message ID to the computing device 12-1. At a time T1, the computing device 12-1 receives the metric message text stream, and streams the metric message text stream on the display 16 for presentation to the user 14. At a time T2, the user 14, while the metric message text stream is presented to the user 14 on the display 16, or within a predetermined period of time thereafter, indicates acceptance of the metric message text stream, such as, by way of non-limiting example, blinking her eyes twice in rapid succession. The computing device 12-1 sends the ACCD 32 an accept notification and the metric message ID, and the ACCD 32 processes the corresponding contact center action set 56, as discussed above.

In some embodiments, the metric message text stream comprises text components, such as words, that are scrolled on the display 16 such that previously displayed words are removed from the left side of the display 16, and new words that are successive in the metric message text stream are added to the right side of the display 16. It will be appreciated that the direction in which words move across the display 16 may differ depending on language and/or culture. In other embodiments, multiple words may be concurrently provided for presentation in the display area of the display 16. Thus, the text components comprise sets of words that will fit within the display area of the display 16 concurrently. In yet other embodiments, the text components may comprise letters, or characters, used to form words. Additionally, the embodiments may be utilized in conjunction with streaming technology, such as that available, by way of non-limiting example, by Spritz Technology, Inc., a Delaware corporation having a place of business at 35 Maple Street, Stoneham, Mass. 02180, United States.

Figure 9:
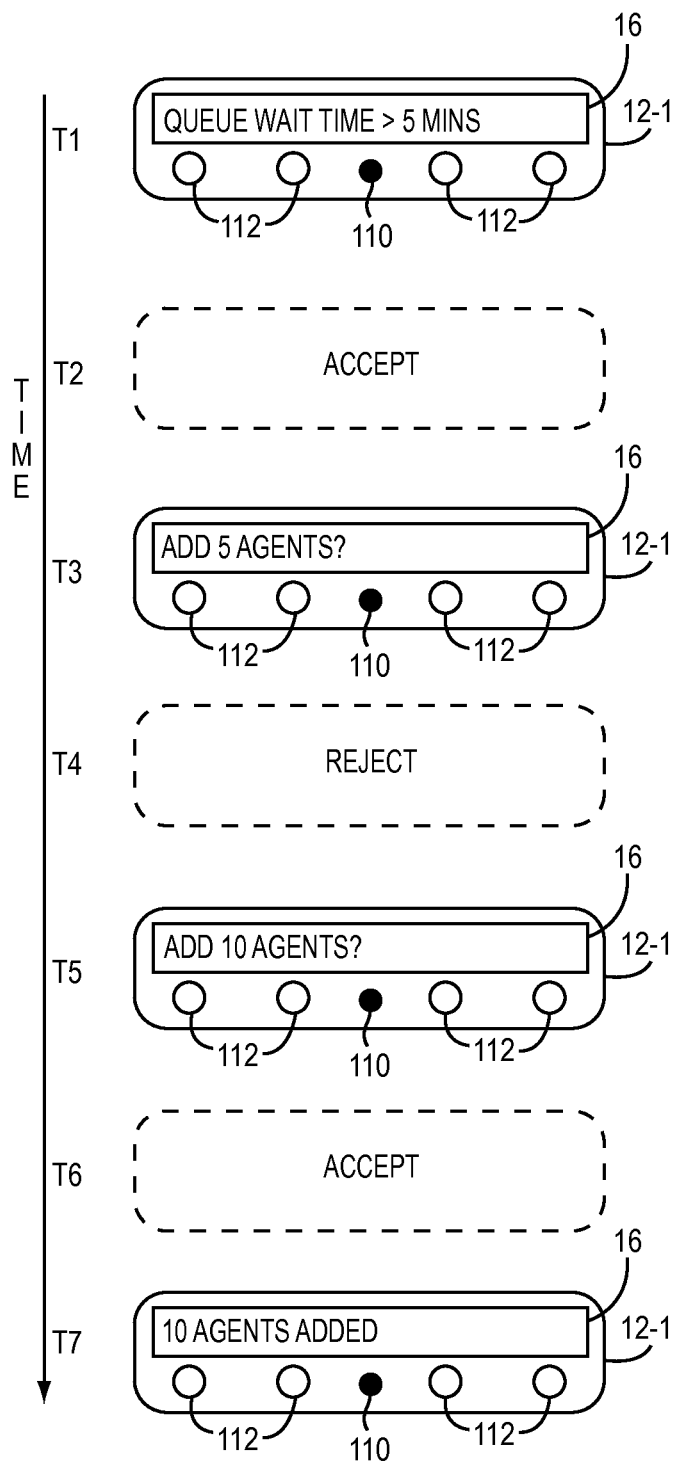
FIG. 9 is a block diagram illustrating the computing device at a plurality of successive times according to another embodiment.

FIG. 9 is a block diagram illustrating the computing device 12-1 at a plurality of successive times according to another embodiment. FIG. 8 will be discussed in conjunction with FIG. 3B. In this embodiment, the ACCD 32 has generated a contact center action set 56-2 identical to the contact center action set 56-2 illustrated above with regard to FIG. 3B. At a time T1, the computing device 12-1 receives a metric message text stream and metric message ID from the ACCD 32 and streams the metric message text stream on the display 16. The metric message text stream identifies a contact center metric, in this example a queue wait time, and indicates that the queue wait time metric value is undesirable. At a time T2, the user 14 accepts the metric message text stream, by, for example, blinking her eyes twice rapidly or by selecting a particular input control 112. The computing device 12-1 communicates an acceptance notification and the metric message ID to the ACCD 32. Referring briefly to FIG. 3B, the ACCD 32 accesses the contact center action set 56-2 based on the metric message ID, and determines that the current processing location is at the beginning of the contact center action set 56-2. The ACCD 32 performs the contact center action 84-1, and sends a metric message text stream that includes the text "ADD 5 AGENTS?," and the metric message ID to the computing device 12-1. The ACCD 32 also updates the current sequence location value to indicate that the contact center action 84-1 has been performed.

Referring now to FIG. 9, the computing device 12-1 receives the metric message text stream and streams the metric message text stream on the display 16 at a time T3. At a time T4, the user 14 rejects the metric message text stream, by, for example, shutting her eyes for a predetermined time frame, or by selecting a particular input control 112.

The computing device 12-1 communicates a reject notification and the metric message ID to the ACCD 32. Referring to FIG. 3B again, the ACCD 32 accesses the contact center action set 56-2 based on the metric message ID and, based on the current sequence location value, determines that the reject notification was in response to the contact center action 84-1. The ACCD 32 follows the reject link 92, performs the contact center action 84-3, and sends a metric message text stream that includes the text "ADD 10 AGENTS?," and the metric message ID, to the computing device 12.

Referring again to FIG. 9, the computing device 12-1 receives the metric message text stream and streams the metric message text stream on the display 16 at a time T5. At a time T6, the user 14 accepts the metric message text stream. The computing device 12-1 communicates an acceptance notification and the metric message ID to the ACCD 32. Referring briefly to FIG. 3B, the ACCD 32 accesses the contact center action set 56-2 based on the metric message ID, and determines that the acceptance notification was in response to the contact center action 84-3. The ACCD 32 performs the contact center action 84-3 and initiates the processing suitable for adding 10 agents to the contact center communication lines. The ACCD 32 also sends a metric message text stream that includes the text "10 AGENTS ADDED," to the computing device 12-1. The ACCD 32 may, at this point in time, delete the contact center action set 56-2.

The computing device 12-1 receives the metric message text stream and streams the metric message text stream on the display 16 at a time T7 to confirm to the user 14 that 10 agents have been added.

Figure 10:
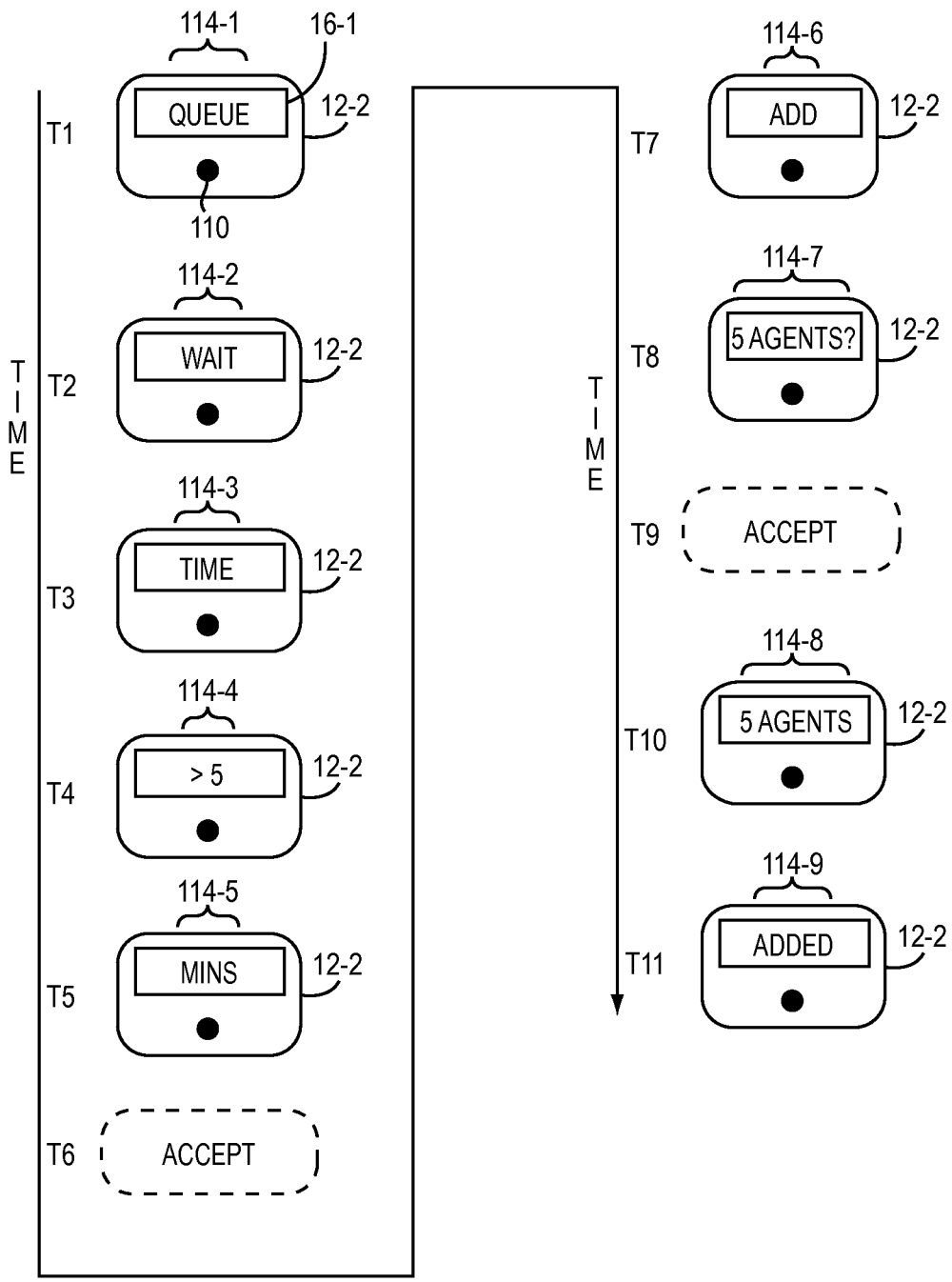
FIG. 10 is a block diagram of a computing device at a plurality of successive times according to another embodiment.

FIG. 10 is a block diagram of a computing device 12-2 at a plurality of successive times according to another embodiment. Except as otherwise stated herein, the computing device 12-2 may be substantially similar to the computing devices 12 and 12-1 discussed above, except as otherwise mentioned herein. The computing device 12-2 comprises a relatively small display 16-1, as well as the front lens 110 that provides a scene to the camera 30 (not illustrated). The computing device 12-2 provides for presentation on the display 16-1 a single word at a time, and thus the computing device 12-2 may have a very small form factor. Text components 114-1-114-9 (generally, text components 114), which are displayed on the display 16-1 over a period of time, generally comprise words, or characters, that can fit within the display 16-1. The text components 114 may be provided for presentation on the display 16-1 at a particular pace, which, as discussed above, may be altered in response to appropriate eye control movements.

Assume, as discussed above with regard to FIG. 9, that the ACCD 32 has generated a contact center action set 56-2 identical to the contact center action set 56-2 illustrated above with regard to FIG. 3B. The computing device 12-2 receives a metric message text stream and metric message ID from the ACCD 32, and at times T1-T5 streams the metric message text stream on the display 16-1. The metric message text stream identifies a contact center metric, in this example a queue wait time, and indicates that the queue wait time metric value is undesirable.

At a time T6, the user 14 accepts the metric message text stream, by, for example, blinking her eyes twice rapidly. The computing device 12-2 communicates an acceptance notification and the metric message ID to the ACCD 32. Referring briefly to FIG. 3B, the ACCD 32 accesses the contact center action set 56-2 based on the metric message ID and determines that the current processing location is at the beginning of the contact center action set 56-2. The ACCD 32 performs the contact center action 84-1, and sends a metric message text stream that includes the text "ADD 5 AGENTS?," and the metric message ID to the computing device 12-2. The ACCD 32 also updates the current sequence location value to indicate that the contact center action 84-1 has been performed.

Referring now to FIG. 10, the computing device 12-2 receives the metric message text stream and streams the metric message text stream on the display 16-1 at times T7-T8. At a time T9, the user 14 accepts the metric message text stream. The computing device 12-2 communicates an acceptance notification and the metric message ID to the ACCD 32. Referring to FIG. 3B, the ACCD 32 accesses the contact center action set 56-2 based on the metric message ID, and determines that the acceptance notification was in response to the contact center action 84-1. The ACCD 32 performs the contact center action 84-1, and initiates the processing suitable for adding 5 agents to the contact center communication lines. The ACCD 32 also sends a metric message text stream that includes the text "5 AGENTS ADDED," to the computing device 12-2. The ACCD 32 may, at this point in time, delete the contact center action set 56-2.

The computing device 12-2 receives the metric message text stream and streams the metric message text stream on the display 16-1 at times T10-T11 to confirm to the user 14 that 5 agents have been added.

While the embodiments have been described herein in the context of the computing device 12 analyzing video imagery of the eye system 102, in other embodiments, some of the functionality described above may be performed by the ACCD 32. In such embodiments, a video processor module (not illustrated) on the ACCD 32 analyzes video imagery of the eye system 102 of the user 14 that is provided to the ACCD 32 by the computing device 12. The video processor module operates substantially similarly to the video processor module 108 described above, except as otherwise stated herein.

A UI control module on the ACCD 32 receives, from the video processor module, the identification of a particular eye control movement and translates the eye control movement into a control command. In one embodiment, the ACCD 32 communicates with the computing device 12 via the WebRTC protocol. In this embodiment, the ACCD 32 establishes a communication interaction that includes the creation of a text channel between the ACCD 32 and the computing device 12. The ACCD 32 also establishes a video channel between the ACCD 32 and the computing device 12-2. The establishment of the text channel and video channel may be accomplished, in some embodiments, by appropriate WebRTC commands and/or messages. The ACCD 32 provides the text components of a metric message text stream via the text channel to the computing device 12 for presentation on the display 16. Substantially concurrently therewith, the computing device 12 begins providing a video stream via the video channel to the ACCD 32 that depicts the eye system 102 of the user 14. The computing device 12 provides the text components of the metric message text stream for presentation on the display 16. The ACCD 32 determines, based on an analysis of the video stream, a control command that indicates acceptance or rejection of the metric message text stream. As discussed above, the determination of the control command is based on a detection, by the video processor module, of an eye movement of the eye system 102 that is depicted in the video stream received from the computing device 12.

Figure 11:
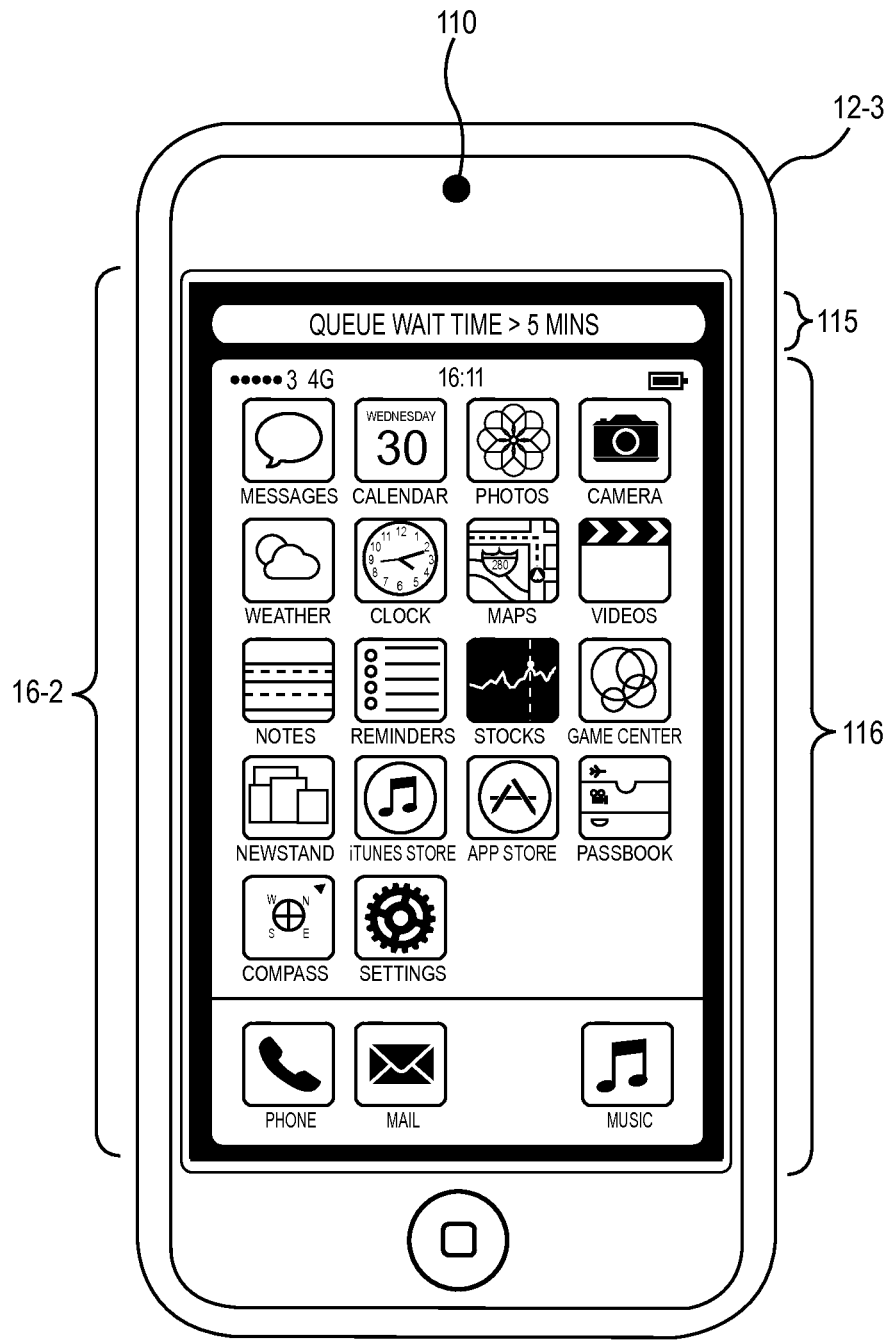
FIG. 11 is a block diagram of a computing device according to another embodiment.

FIG. 11 is a block diagram of a computing device 12-3 according to another embodiment. Except as otherwise stated herein, the computing device 12-3 may be substantially similar to the computing devices 12, 12-1, and 12-2 discussed above. In this embodiment, the computing device 12-3 comprises a smartphone. The computing device 12-3 comprises a relatively large display 16-2 and includes the front lens 110 that provides a scene to the camera 30 (not illustrated). A display 16-2 includes a display area 115 in which embodiments discussed herein may be practiced, and a display area 116 in which other functionality may be provided, in some embodiments concurrently with providing the functionality described herein.

Figure 12:
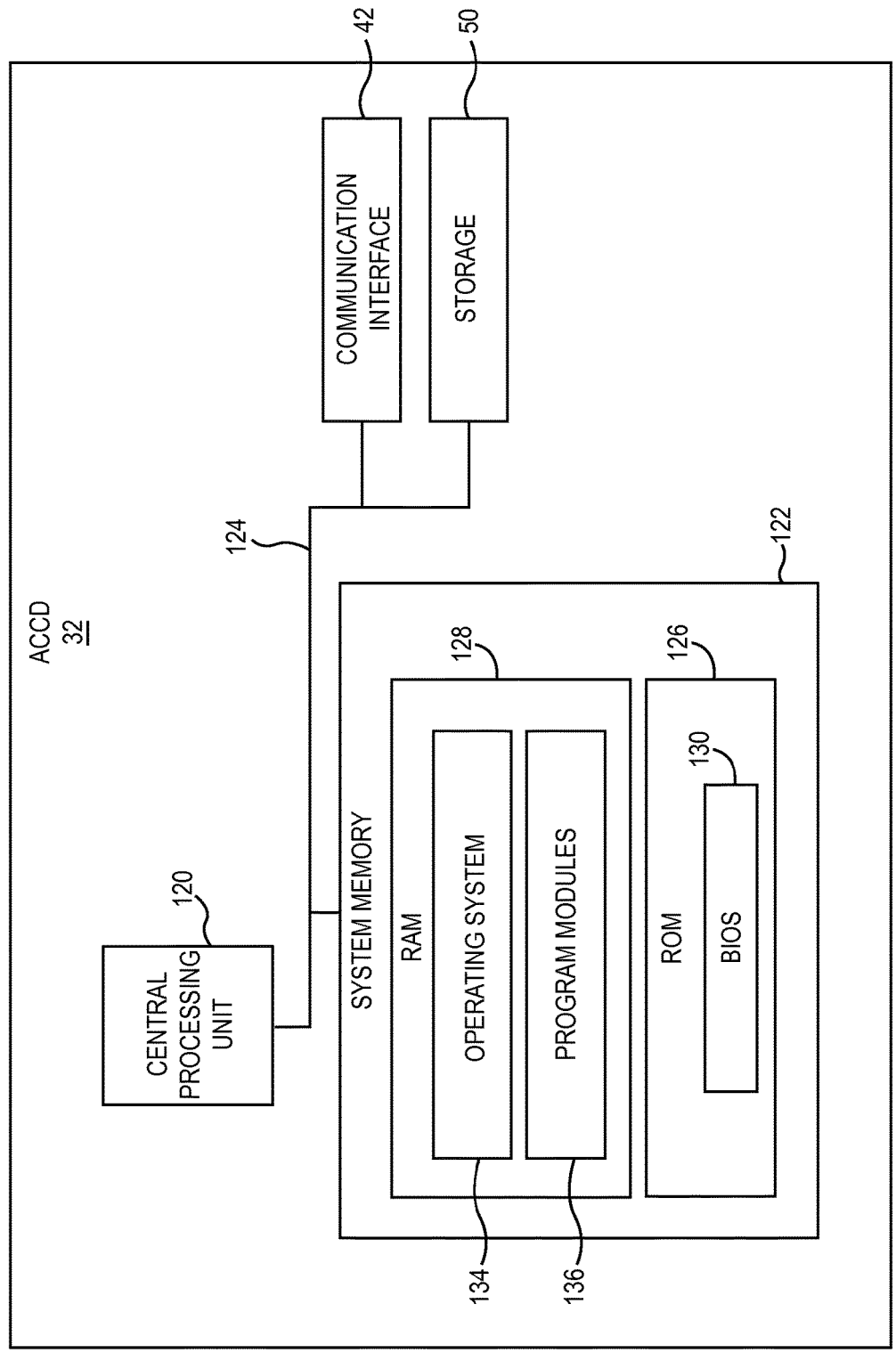
FIG. 12 is a block diagram of an automated contact center device according to one embodiment.

FIG. 12 is a block diagram of the ACCD 32 according to one embodiment. The ACCD 32 may comprise any computing or processing device capable of including firmware, hardware, and/or executing software instructions to implement the functionality described herein, such as a work station, desktop computer, telecommunications switch, server, laptop computer, or the like. The ACCD 32 includes a central processing unit 120, a system memory 122, and a system bus 124. The system bus 124 provides an interface for system components including, but not limited to, the system memory 122 and the central processing unit 120. The central processing unit 120 can be any commercially available or proprietary processor.

The system bus 124 may be any of several types of bus structures that may further interconnect to a memory bus (with or without a memory controller), a peripheral bus, and/or a local bus using any of a variety of commercially available bus architectures. The system memory 122 may include non-volatile memory 126 (e.g., ROM, EPROM, EEPROM, etc.) and/or volatile memory 128 (e.g., RAM). A BIOS 130 may be stored in the non-volatile memory 126, and can include the basic routines that help to transfer information between elements within the ACCD 32. The volatile memory 128 may also include a high-speed RAM, such as static RAM for caching data.

The ACCD 32 may further include or be coupled to the storage 50, which may comprise, for example, an internal or external HDD (e.g., EIDE or SATA), HDD (e.g., EIDE or SATA) for storage, flash memory, or the like. The computer-readable storage 50 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 50 and in the volatile memory 128, including an operating system 134 and one or more program modules 136, which may implement the functionality described herein in whole or in part, including for example functionality associated with the CC monitoring module 46 and the metric message generation module 48.

All or a portion of the embodiments may be implemented as a computer program product stored on a transitory or non-transitory computer-usable or computer-readable storage medium, such as the computer-readable storage 50, which includes complex programming instructions, such as complex computer-readable program code, configured to cause the central processing unit 120 to carry out the steps described herein. Thus, the computer-readable program code can comprise software instructions for implementing the functionality of the embodiments described herein when executed on the central processing unit 120. The central processing unit 120, in conjunction with the program modules 136 in the volatile memory 128, may serve as a controller for the ACCD 32 that is configured to, or adapted to, implement the functionality described herein. The ACCD 32 also includes the communication interface 42 for communicating with the computing device 12 via the network 20.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
obtaining, by a processor of a contact center system, a metric value that quantifies an operational characteristic of the contact center;
determining, by the processor of the contact center system, that the metric value is not within a predetermined range of values for the operational characteristic; and
in response to determining that the metric value is not within the predetermined range of values for the operational characteristic:
determining, by the processor of the contact center system, a computing device associated with a user;
generating, by the processor of the contact center system, a first metric message text stream based on a message template associated with the operational characteristic, at least one parameter associated with the operational characteristic, and a contact center action set identifier identifying an action template of a plurality of action templates, wherein the first metric message text stream comprises an interactive flow, and wherein the interactive flow is associated with a unique metric message identifier (ID);
generating, by the processor of the contact center system, a contact center action set based on the action template identified by the contact center action set identifier in the message template, the action template defining at least one contact center action directed to the operational characteristic, wherein the generated contact center action set is associated with the first metric message text stream;
storing, by the processor of the contact center system, the unique metric message ID and the contact center action set in a storage; and
sending, by the processor of the contact center system, the first metric message text stream to the computing device.

2. The method of claim 1, wherein the operational characteristic comprises one of a number of caller transfers, a rate of abandonment, an average wait time of an individual prior to being serviced, a number of contacts queuing, an agent staffing level, a number of agents available, a line of business service level, a queue service level, a number of agents in a not ready state, or an agent conformance to regulatory policy.

3. The method of claim 1, wherein determining that the metric value is not within the predetermined range of values comprises determining that the metric value is below a first predetermined threshold, or determining that the metric value is above a second predetermined threshold.

4. The method of claim 3, wherein determining that the metric value is not within the predetermined range of values further comprises:
accessing a user profile of the user associated with the computing device; and
determining, based on the user profile, the first predetermined threshold and the second predetermined threshold.

5. The method of claim 4, wherein generating the first metric message text stream comprises:
selecting the message template from a plurality of message templates based on the computing device and the operational characteristic, wherein the message template comprises text and at least one parameter identifying the first predetermined threshold or the second predetermined threshold; and
generating the first metric message text stream using the text of the message template and based on the at least one parameter of the message template.

6. The method of claim 1, further comprising:
receiving, by the processor of the contact center system, a message response from the computing device;
determining, by the processor of the contact center system, that the message response is associated with the contact center action set based on the unique metric message ID;
accessing, by the processor of the contact center system, the contact center action set; and
performing, by the processor of the contact center system, the at least one contact center action based on the message response.

7. The method of claim 6, wherein receiving the message response comprises:
receiving, from the computing device, imagery that depicts an eye system of the user associated with the computing device;
analyzing the imagery to detect a control command;
determining the message response based on the control command.

8. The method of claim 1,
the action template defines the at least one contact center action based on at least one parameter associated with the operational characteristic defined in the message template.

9. The method of claim 8, wherein generating the contact center action set further comprises:
accessing a user profile of the user associated with the computing device;
obtaining from the user profile a parameter value for each of the at least one parameters in selected action template; and
generating the contact center action set based on the selected action template and obtained parameter value for each of the at least one parameters in selected action template.

10. The method of claim 8, wherein generating the contact center action set further comprises:
generating a plurality of contact center actions based on the contact center action template to generate the contact center action set, the contact center action set having a processing sequence defined in the selected action template and that is dependent on a received response from the user; and
storing the contact center action set in the storage.

11. The method of claim 10, further comprising:
receiving, by the processor of the contact center system, a message response from the computing device;
determining, by the processor of the contact center system, that the message response is associated with the contact center action set based on the unique metric message ID;
accessing, by the processor of the contact center system, the contact center action set;

determining, by the processor of the contact center system, a current sequence location within the defined processing sequence;
based on the current sequence location, determining, by the processor of the contact center system, a next contact center action within the contact center action set; and
performing, by the processor of the contact center system, the next contact center action.

12. The method of claim 11, wherein determining the current sequence location comprises:
accessing a current sequence location pointer that identifies the current sequence location of the contact center action set.

13. The method of claim 12, further comprising updating the current sequence location pointer after performing the next contact center action.

14. The method of claim 11 wherein performing the next contact center action comprises:
generating a second metric message text stream; and
sending the second metric message text stream to the computing device.

15. The method of claim 11 wherein performing the next contact center action comprises generating an add agents message, and sending the add agents message to a device other than the computing device.

16. The method of claim 1, wherein sending the first metric message text stream to the computing device comprises sending the first metric message text stream and the unique metric message ID to the computing device.

17. The method of claim 1, wherein the first metric message text stream is generated for rendering text components of the first metric message text stream consecutively as time progresses on a display of the computing device.

18. A computing device, comprising:
a communication interface configured to communicate with a network; and
a controller communicatively coupled to the communication interface, and configured to:
obtain a metric value that quantifies an operational characteristic of a contact center;
determine that the metric value is not within a predetermined range of values for the operational characteristics; and
in response to determining that the metric value is not within the predetermined range of values for the operational characteristic:
determine a computing device associated with a user;
generate a first metric message text stream based on a message template associated with the computing device and the operational characteristic, the message template defining a format associated with the computing device and text for the generated first metric message text stream, at least one parameter associated with the operational characteristic, and a contact center action set identifier identifying an action template of a plurality of action templates, wherein the first metric message text stream comprises an interactive flow, and wherein the interactive flow is associated with a unique metric message identifier (ID);
generate a contact center action set comprising at least one contact center action based on the action template identified by the contact center action set identifier in the message template, the action template defining at least one contact center action directed to the operational characteristic, wherein the generated contact center action set is associated with the first metric message text stream;
store the unique metric message ID and the contact center action set in a storage; and
send the first metric message text stream to the computing device.

19. The computing device of claim 18, wherein the controller is further configured to:
receive a message response;
determine that the message response is associated with the contact center action set based on the unique metric message ID;
access the contact center action set; and
perform the at least one contact center action based on the message response.

20. A computer program product stored on a computer-readable storage medium and including instructions configured to cause a processor to carry out the steps of:
obtaining a metric value that quantifies an operational characteristic of a contact center;
determining that the metric value is not within a predetermined range of values for the operational characteristic; and
in response to determining that the metric value is not within the predetermined range of values for the operational characteristic:
determining, a computing device associated with a user;
generating a first metric message text stream based on a message template associated with the computing device and the operational characteristic, the message template defining a format based on the computing device and text for the generated first metric message text stream, at least one parameter associated with the operational characteristic, and a contact center action set identifier identifying an action template of a plurality of action templates, wherein the first metric message text stream comprises an interactive flow, and wherein the interactive flow is associated with a unique metric message identifier (ID);
generating a contact center action set comprising at least one contact center action based on the action template identified by the contact center action set identifier in the message template, the action template defining at least one contact center action directed to the operational characteristic, wherein the generated contact center action set is associated with the first metric message text stream;
storing the unique metric message ID and the contact center action set in a storage; and
sending the first metric message text stream to the computing device.

21. The computer program product of claim 20, wherein the instructions further cause the processor to carry out the steps of:
receiving a message response;
determining that the message response is associated with the contact center action set based on the unique metric message ID;
accessing the contact center action set; and
performing the at least one contact center action based on the message response.

* * * * *